United States Patent [19]

Kyu

[11] Patent Number: 5,905,554
[45] Date of Patent: May 18, 1999

[54] NON-BIREFRINGENT OPTICAL ADHESIVES AND FILMS

[75] Inventor: Thein Kyu, Akron, Ohio

[73] Assignee: The University of Akron, Akron, Ohio

[21] Appl. No.: 08/778,853

[22] Filed: Jan. 6, 1997

Related U.S. Application Data

[63] Continuation of application No. 08/250,040, May 27, 1994, abandoned.

[51] Int. Cl.$^6$ ............................ C03C 27/00; G02F 1/1333
[52] U.S. Cl. ............................ 349/122; 349/158; 523/168
[58] Field of Search ................................ 359/73, 74, 82; 156/330, 331.1; 525/117; 349/122, 158, 117, 119; 523/168

[56] References Cited

U.S. PATENT DOCUMENTS

| | | | |
|---|---|---|---|
| 4,201,450 | 5/1980 | Trapani | 350/150 |
| 4,373,065 | 2/1983 | Prest, Jr. . | |
| 4,544,583 | 10/1985 | Claussen et al. . | |
| 4,743,654 | 5/1988 | Kyu et al. . | |
| 4,785,053 | 11/1988 | Ito et al. | 525/146 |
| 4,906,696 | 3/1990 | Fischer et al. . | |
| 4,985,285 | 1/1991 | Ichikawa et al. | 428/1 |
| 5,045,397 | 9/1991 | Jensen | 428/429 |
| 5,049,619 | 9/1991 | Kyu . | |
| 5,103,336 | 4/1992 | Sieloff | 359/293 |
| 5,110,869 | 5/1992 | Cohen et al. | 525/194 |
| 5,138,001 | 8/1992 | Ueda et al. | 526/262 |
| 5,138,474 | 8/1992 | Arakawa | 359/73 |
| 5,196,953 | 3/1993 | Yeh et al. | 359/73 |
| 5,357,008 | 10/1994 | Tsai et al. | 525/526 |
| 5,380,459 | 1/1995 | Kanemoto et al. | 359/73 |

OTHER PUBLICATIONS

Kuy, Park and Cho titled "Single–Phase Blends of Polycarbonate and Poly(Phenyl Methacrylate)" 1992 No Date Provided.

*Primary Examiner*—Hung X. Dang
*Assistant Examiner*—Tai V. Duong
*Attorney, Agent, or Firm*—Renner, Kenner Greive, Bobak, Taylor & Weber

[57] ABSTRACT

The invention pertains generally to miscible polymer blends which can be used in optical applications, particularly in liquid crystal displays and optical adhesives, in that they are essentially birefiringence-free. The polymeric blend alloy includes a first polymer having an inherent positive birefringence and a second polymer having an inherent negative birefringence, the first and second polymers being soluble within each other to predefined limits. The polymer blend is an essentially birefringence-free film layer suitable for use in liquid crystal displays which has adequate mechanical properties, such as dimensional stability, permeability to water vapor, scratch-resistance and insensitivity to temperature, in that it is possible for them to be processed continuously and flexibly to all the required shapes. The polymer blends can be prepared not only from solvent solutions, but by melt-mixing as well.

4 Claims, 4 Drawing Sheets

NON-BIREFRINGENT OPTICAL ADHESIVES AND FILMS

This application is a continuation of U.S. patent application Ser. No. 08/250,040, filed May 27, 1994 now abandoned.

TECHNICAL FIELD

The invention described herein pertains generally to miscible polymer blends which can be used in optical applications, particularly in liquid crystal displays and optical adhesives, in that they are essentially birefiingence-free.

BACKGROUND OF THE INVENTION

Liquid crystals are useful for electronic displays because light travelling through a thin film of liquid crystal is affected by the birefringence of the film, which can be controlled by the application of a voltage across the film. Liquid crystal displays are desirable because the transmission or reflection of light from an external source, including ambient light, can be controlled with much less power than is required for luminescent materials used in other displays. Liquid crystal displays are now commonly used in such applications as digital watches, calculators, portable computers, and many other types of electronic equipment where the need exists for long-lived operation, with very low voltage and low power consumption. In particular, portable computer displays benefit from liquid crystal displays where display power utilization must be minimized to permit the battery to operate for as long a period of time as possible before recharging, while allowing the majority of the battery utilization to be directed toward computational efforts.

Glass has typically been used in visual displays which utilize liquid crystal materials. However, the use of glass has a number of disadvantages. For reasons of cost, alkali metal silicate glasses are used, and these must be coated with SiO in order to prevent the migration of the alkali metal. Additionally, the ultimate shapes are somewhat limited, in that only certain shapes can be economically processed. Chipping of glass plates is also an inherent problem.

There have been attempts to use transparent plastics as a substitute for glass. Transparent polymers can be inexpensively molded, as opposed to requiring more expensive grinding processes, but they are typically anisotropic, causing light to be refracted through them along several paths. This birefringence leads to the distortion of light waves passing through optical products made from such plastics, and detrimentally affecting their performance. U.S. Pat. No. 4,228,574 describes a liquid crystal display using plastic. However, as a rule, plastics are neither particularly isotropically, nor particularly mechanically or chemically stable, nor inexpensive. However, as shown in the '574 patent, they are well suited for automated production. It is evident, that the technology of glass displays cannot be simply transferred to plastics. Although a plastic can be found which closely matches, or is even superior to, the properties of the glass for each process step of the glass technology, no cell made of plastic has yet been described which would be equally as good as the glass cell, simply because all of the properties must be found by one plastic.

It has been proposed to use polyesters in place of glass. As a film, polyester is highly birefringent, and thus cannot be employed in the customary components using polarizers. Cellulose butyrate is isotropic, but is unsatisfactory in respect of its mechanical, especially thermal, and chemical properties, and has undesirable light scattering properties. Polycarbonate has also been proposed, but it is highly birefringent.

This invention generally pertains to optically isotropic devices or components, and more particularly to optically isotropic devices or components made of an optically isotropic polymeric material which is a blend of at least two completely miscible polymers. By the term, "optically isotropic", it is intended to refer to the properties in certain materials wherein their optical properties are the same in all directions, such properties including the index of refraction and light absorption.

Very few materials are optically isotropic. Few, if any molded organic polymeric materials are optically isotropic. Such transparent or partially transparent polymers as polyethylene, Lucite®, trade mark of the E.I. duPont de Nemours Company, polymethylmethacrylate (PMMA), etc., are not optically isotropic. This may be seen by making a relatively thin layered sample of the polymeric material and then determining its birefringence and absorption of polarized light. Birefiingence of the sample is determined by finding the indices of refraction of the sample for polarized light in one direction and that for polarized light in a direction perpendicular to the first direction. The difference in the two indices of refraction is the birefringence of the sample material.

Even when a polymeric material has zero birefringence in its bulk state, the processing of such a material into a device, such as by extrusion or injection molding places stresses on the material in the direction of flow. Such mechanical stresses induce orientation of the polymer molecules, which almost always results in flow-induced birefringence.

Thus it can be seen that what is still lacking in the prior art is a material which can cycle between low and high temperature without associated delamination, the refractive index of which can be adjusted to fit the needs of the application, and the birefringence of which can be tailored.

SUMMARY OF THE INVENTION

In accordance with the present invention, there is provided a polymeric blend alloy of a first polymer having an inherent positive birefringence and a second polymer having an inherent negative birefringence, the first and second polymers being soluble within each other to predefined limits.

It is an object of this invention to provide polymer blends which are essentially birefringence-free.

It is another object of this invention to provide an essentially birefringence-free film layer suitable for use in liquid crystal displays which has adequate mechanical properties, such as dimensional stability, permeability to water vapor, scratch-resistance and insensitivity to temperature, in that it is possible for them to be processed continuously and flexibly to all the required shapes.

It is still another object of this invention to provide a birefringence-free film by blending polymers having positive birefringence with polymers having compensating amounts of negative birefringence.

It is yet another object of this invention to provide polymer blends that can be prepared not only from solvent solutions, but by melt-mixing as well.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
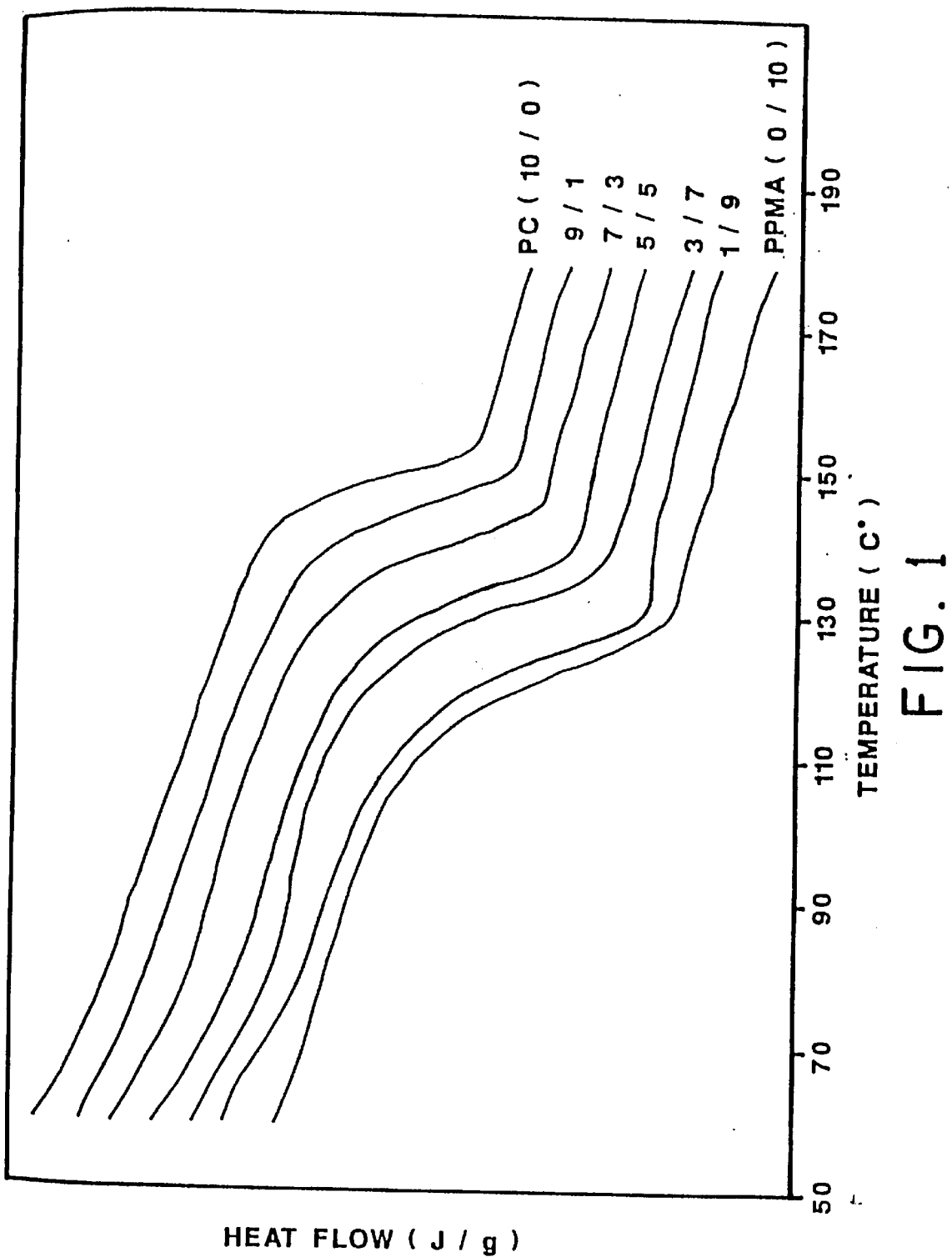
FIG. 1 is a plot of glass transition temperatures for various blends of polycarbonate and poly(phenyl methacrylate) prepared by melt blending.

In many optical devices, it is important that optical clarity and uniformity be achieved. For example, in uses as optical disks for information storage and lenses, optical clarity and uniformity are the basic requirements of the devices. Although glass of various compositions is frequently used in optical devices, it is sometimes necessary or desirable to use organic polymeric materials in optic devices. In such a situation, care must be taken to insure that optical anisotropies are not introduced through either the nature of the optical polymers employed or through the processing of the polymers.

Although optical anisotropies may originate with the nature of the materials employed, this problem is usually avoided by the proper choice of materials. Thus, when a material does not have the proper optical properties while in its bulk state, other materials will be chosen. However, it is more difficult to avoid optical anisotropies which may be introduced through the processing of the materials. For example, in injection molding or casting processes, or in practically any other shape-forming processes, stress must be placed on the polymeric materials to force them to flow or to conform to the shape of the mold. Such stresses are directional in nature and have the effect of orienting the long molecules of the polymer in the direction of the applied stress. It is believed that the observed optical birefringence in optical devices and components made of polymeric materials is due to the orientation of the molecules during the manufacturing process. For the purposes of the invention, such optical birefringence may be thought of as the difference in the indices of refraction of the optical device when subjected to light sources that have been polarized in different directions.

One solution to this optical anisotropic problem caused by stressing and orientation of the polymer molecular chains is to hold the devices in the mold until the internal stresses relax. However, this approach drastically increases the manufacturing cycle times, and partially or totally negates the improvements in the mechanical properties in the polymer due to the applied stress and orientation of the molecular chains. It is accordingly, desirable to have an optically isotropic device whose lack of birefringence is not substantially changed by manufacturing and other processing steps.

Specifically, this reduction or substantial elimination of birefringence from blends of polymers is achieved by mixing polymers possessing positive birefringence with polymers that possess negative birefringence, the mixed polymers being miscible with each other and present in the blends in relative amounts such that the positive birefringence of the former counterbalances the negative birefringence of the latter, thereby producing a polymer blend having a birefringence that approaches zero.

The approach of this invention is to accept the inevitability of chain orientation, rather than attempt to reduce or eliminate it. Instead, the reduction or elimination of birefringence is based on preparing polymer blends in which one polymer component which has a positive birefringence is intimately mixed with another polymer having a negative birefringence, the two being combined in relative amounts such that the birefringence of the one counterbalances the birefringence of the other. Such a technique makes it unnecessary to avoid the induced chain orientation problem, which has often been considered to be the factor of primary importance.

The invention disclosed herein relies on the fact that the arylene groups present in the polycarbonate polymers cause light traveling through the polymers to be polarized along the longitudinal or "backbone" axis of the polymer, yielding positive birefringence. On the other hand, the polymers discovered to be useful in mixing with the polycarbonates to produce low or zero birefringent blends have the group responsible for enhancing the polarization of light passing through the polymer located in a side chain attached transversely to the backbone thereof, thereby producing a polymer exhibiting negative birefringence. Thus, by combining the two types of polymers in appropriate amounts, their birefringence is counterbalanced, making them exceptionally suitable for the fabrication of optical products.

In preparing the blends, however, it is to be noted that their intimate mixing is necessary in order to achieve effective counterbalancing of the birefringence of each. In this regard, and in connection with other blends of the prior art capable of yielding low birefringent compositions, it has been necessary to resort to solvent mixing of the polymers. While solvent mixing is capable of yielding polymer blends in which the mixed polymers are substantially homogeneous at a molecular level, i.e., the different individual molecules are in close association with each other, solvent mixing has various drawbacks. It is one of the benefits of the polymer blends disclosed herein, that they can be mechanically mixed by meltmixing techniques, and not only by solvent methods, which is of considerable advantage.

The blends are especially useful in the preparation of optical products, their transparency being of significant importance, and in this regard, it has been found that the polymer blends of the invention are characterized by their ability to transmit about 90–95% of the light passing through them, a value to be compared with light transmission through glass which is only slightly superior, being in the order of 95–97%, and with other polymer blends of the type often claimed to have optical properties, but which frequently exhibit light transmission values only in the order of about 80–85%.

Blends of the type contemplated in the invention comprise blends of polycarbonate-type polymers, including their analogs, with polymers of the polyalkylacrylate-type, including their analogs. Among the polycarbonate-type polymers is bisphenol-A polycarbonates of the general formula I.

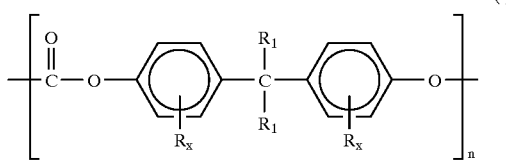

(I)

where $R_1$ can be hydrogen, methyl or phenyl, and wherein R in $R_x$ is a substituent on the arylene ring independently selected from the group consisting of halogens, $C_{1-4}$ alkyls, and $C_{1-4}$ halogenated alkyls, and wherein n is an integer representing the degree of polymerization such that the molecular weight ranges from ~10,000 to 30,000, preferably ~20,000, and x is a positive whole integer ranging from 0 to 4. Among such polymers, the use of bisphenol-A polycarbonate as one of the constituent polymers of the blend comprises the preferred embodiment.

Among the polyalkylacrylate or polyarylacrylate type polymers suitable for blending with the polycarbonate-type polymer, is that of general formula (II).

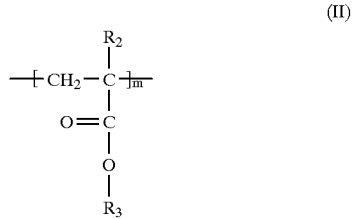

(II)

wherein $R_2$ is selected from the group consisting of hydrogen and alkyl groups of $C_{1-10}$, $R_3$ is selected from the group consisting of $C_{1-10}$ alkyl groups, phenyl, substituted phenyl (e.g., halogenated phenyl and alkylated phenyl of $C_{1-4}$, and m is an integer representing the degree of polymerization. Among such compounds, poly(phenyl methacrylate), poly(benzyl methacrylate) and poly(2-phenylethyl methacrylate), have been found to be effective. However, poly(phenyl methacrylate) has been found to be particularly useful.

If desired, multiple polymers can be blended together, for example, more than one polycarbonate, or more than one polyalkylacrylate may be included in the blend. In addition to being blendable to produce low, or substantially zero birefringent compositions, such blends exhibit outstanding clarity and transparency. Furthermore, the blends are economically attractive since the relatively low-cost polyalkylacrylates provide the possibility of extending a more expensive polymer with a less costly one.

Irrespective of the character of their birefringence, it is unusual to find polymers that can be melt-processed to yield homogeneous polymer blends. It was, therefore, surprising to discover that a polycarbonate can be melt-mixed with a polyalkylacrylate or polyarylacrylate to produce a single phase polymer blend substantially homogeneous at a molecular level displaying a glass-like transparency. The melt technique used for the purpose can involve the admixture of a solid polycarbonate with a solid polyalkylacrylate, and the subsequent melting of the mixture, or it may be accomplished by melting one of the polymers and adding the other polymer to it as a solid at a temperature sufficient to melt both. Alternatively, both polymers can be separately melted and thereafter combined. Of course, equally applicable methods, known in the art, are envisioned to be a part of the scope of this invention.

While melt-mixing of the components making up the polymer blends is preferred for the reasons stated, the materials can also be solvent mixed. In this regard, any of the solvent commonly employed for dissolving the polymers can be employed for such purpose including solvents such a tetrahydrofuran, cyclohexanone, methylene chloride, or others. Following solution and mixing of the polymers, the solid blend can be prepared in the form of a cast film, or precipitated from solution by adding a non-solvent.

FIG. 1, which is a plot of the glass transition temperatures for various blends of polycarbonate and poly(phenyl methacrylate) prepared by melt-blending, demonstrates the miscibility and homogeneous nature obtained by melt-mixing the two polymeric components. Results such as those are reproducible despite repeated heating cycles, confirming the true miscibility of the blends. The Figure, in which heat flow is measured by a differential scanning calorimeter, plots joules per gram of polymer blend vs. temperature. As can be seen, the glass transition temperature of the blend shifts systematically with composition, establishing the existence of a single glass transition temperature and confirming the blend's molecular homogeneity.

Figure 2:
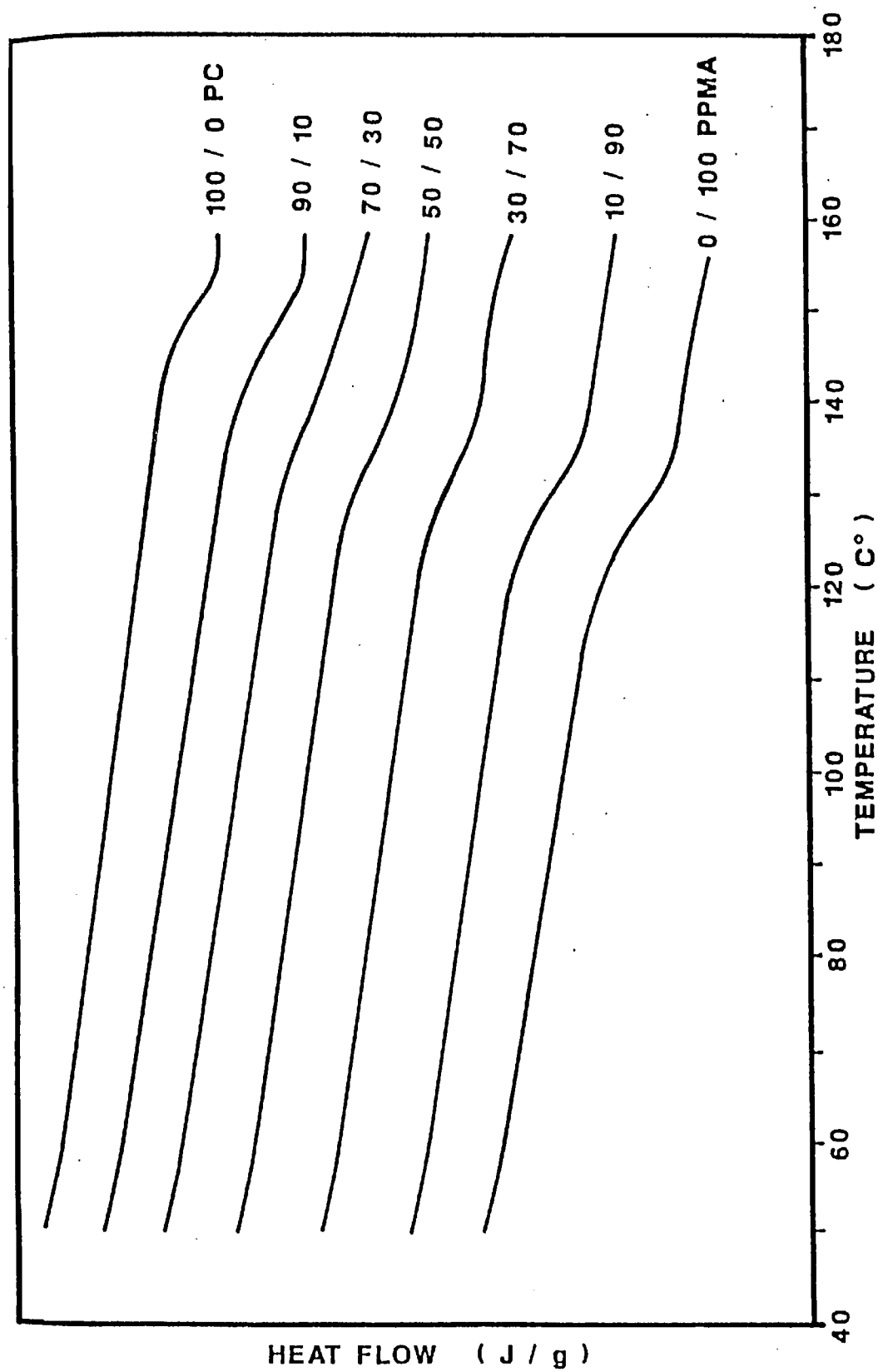
FIG. 2 is a plot of glass transition temperatures of various blends of polycarbonate and poly(phenyl methacrylate) prepared by solution blending.

FIG. 2 is a plot of the glass transition temperature of various blends of polycarbonate and poly(phenyl methacrylate) prepared by solution blending. Again, as in the case of the polymers blended by melt-mixing shown in FIG. 1, the systematic shift of the glass transition temperature with composition establishes the existence of molecular homogeneity of the blended polymers, confirming the fact that such homogeneity can be achieved either by melt or solution mixing of the polymers.

The ratio of the polyalkyl(meth)acrylate or polyaryl (meth)acrylate component of the blend to the polycarbonate portion will depend upon the degree of birefringence reduction desired, as well as upon the nature of the polymers being mixed. The exact ratio is readily determined by simple experimentation as described hereinafter, using techniques well within the capabilities of those skilled in the art. Particularly in the case of a blend of poly(phenyl methacrylate) with bisphenol-A polycarbonate, desirable reductions in the birefringence of the blend can be obtained when the polymers are combined, on a weight basis, in the ratio of from about 20:80 to about 40:60, polycarbonate to poly(phenyl methacrylate).

Figure 3:
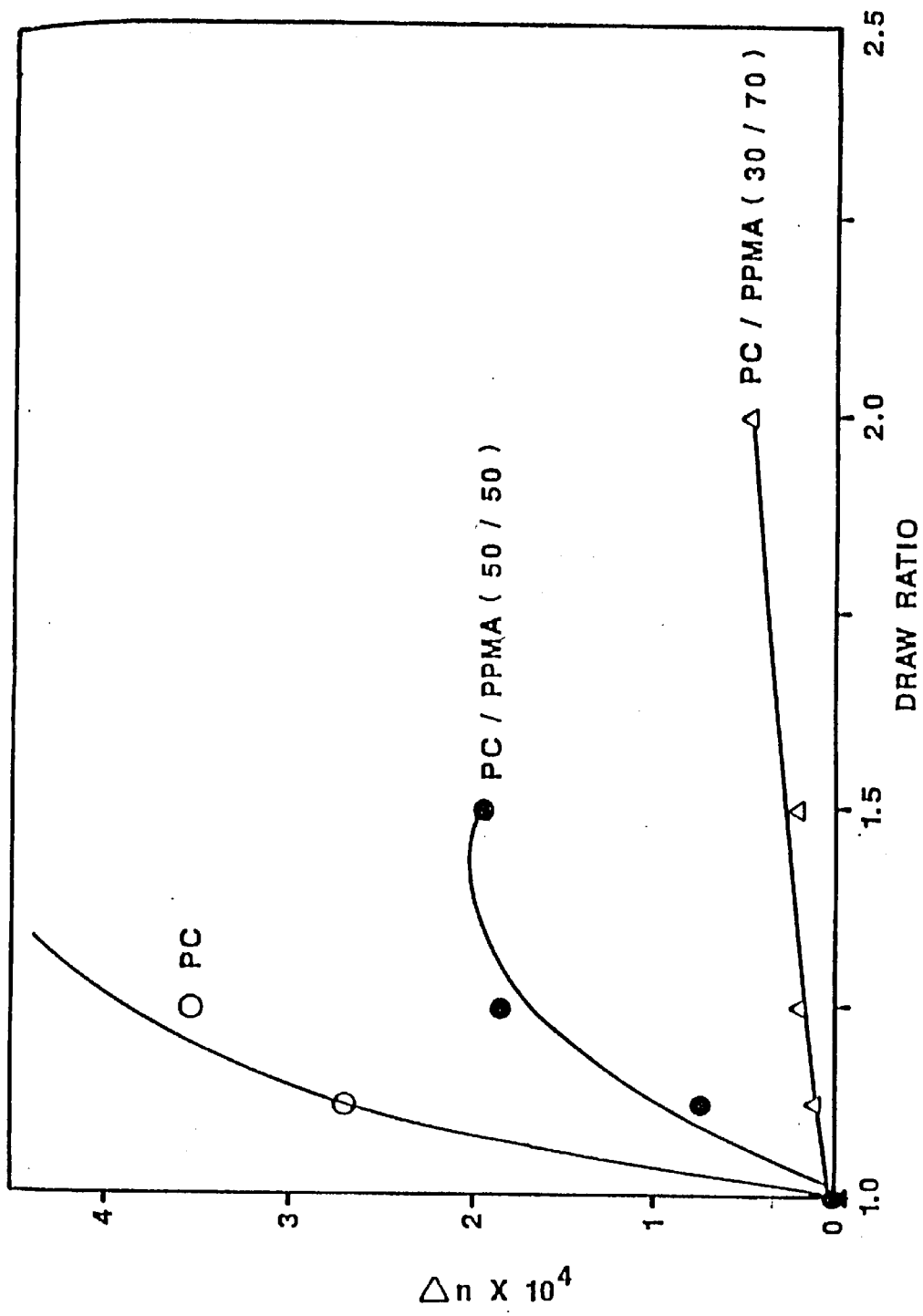
FIG. 3 is a plot of polymer birefringence vs. blend composition at different draw ratios for various blends of polycarbonate (PC) and poly(methyl methacrylate) (PMMA)

FIG. 3 is a plot of polymer birefringence, Δn, versus composition at various draw ratios for different blends of polycarbonate and poly(methyl methacrylate), the blends being shown on a weight basis. Drawing of the polymer blends results in the orientation of their molecules, giving rise to their birefringence. Therefore, by plotting birefringence against draw ratio for a number of polymer ratios, one can readily estimate the ratio likely to produce a blend having zero birefringence, irrespective of molecular orientation.

While the above invention has been described with reference to polymer blends of polycarbonate and polyalkylmethacrylate or polyarylmethacrylate, there is no need to limit the invention to such. In fact, the invention relates to blends of bisphenol-A epoxy polymers, which generally exhibit large residual positive birefringence (i.e., optical anisotropy) during curing, and polymers which typically exhibit negative birefringence, such as the polymethyl methacrylate polymer isomers (e.g., atactic and isotactic polymethylmethacrylate), polymethyl acrylate polymer isomers, copolymers of polymethylmethacrylate and styrene, and polystyrene derivatives. In a preferred embodiment, the negative birefringent polymer will be prepared from an a,α,β unsaturated monomer. In its broadest form, this invention relates to birefringence-free optical polymeric materials using thermoset/thermoplastic miscible polymer blends. That is, the invention relates to a polymer blend of at least one first polymer, such as a bisphenol-A epoxy polymer, having inherent positive birefringence and at least two reactive functional groups and at least one second polymer having essentially compensating amounts of inherent negative birefringence and at least one functional group to provide optical products which are essentially birefringence-free and essentially transparent.

One specific example of such a blend is a copolymer blend of Epon 828 with various polymers which exhibit negative birefringence. Epon 828 is an epoxy-based polymer of epichlorohydrin

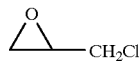

and bisphenol-A

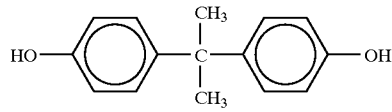

to produce a polymer of generic formula (III)

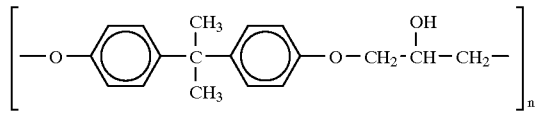

wherein n once again represents the degree of polymerization.

In the following Examples, the following abbreviations are used:

MDA p,p'-methylenedianiline;

TETA triethylenetetramine; and

Capcure poly[oxy(methyl-1,2-ethanediyl)]-α-hydro-ω-(2,3-mercaptopropoxy)-α,α',α"-ether with 2-(hydroxymethyl)-2-methyl-1,3-propanediol (3:1); and wherein MDA is of formula

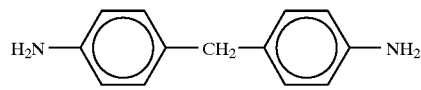

and TETA is of formula

The best mode for carrying out the invention will now be described for the purposes of illustrating the best mode known to the applicant at the time. The examples are illustrative only and not meant to limit the invention, as measured by the scope and spirit of the claims.

EXAMPLE #1

Various mixtures of polyvinyl butyral (PVB),

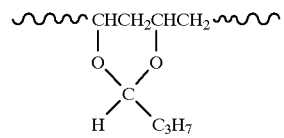

a copolymer of vinyl alcohol and butyraldehyde divinyl acetate, having a 19% vinyl alcohol content and bisphenol A epoxy (EPON 828)

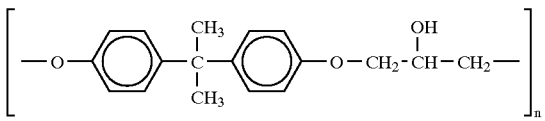

were prepared as optical adhesives by dissolving the dry PVB and epoxy in a common solvent such as tetrahydrofuran (THF), chloroform, toluene or their mixtures of varying ratios to give solutions containing 10–20% by weight of polymer solids. The mixtures prepared were 5/95, 10/90, 20/80, . . . 80/20, 90/10, 95/5 PVB/epoxy. Samples of these solutions were cast onto slide glasses at ambient temperature in a quiescent condition. The solvent was allowed to evaporate, then a cover glass was placed and compressed for several times to remove bubbles. The specimen was transferred onto a hot plate controlled at 80° C. for a minimum of 12 hours under a load of 1 kg. The high PVB content blends, up to 30 weight percent, were completely cured due to the chemical reactions between functional groups of PVB and epoxide groups of Epon, presumably initiated by the vinyl alcohol substituents. These mixtures were completely transparent (greater than 90%) and had excellent adhesion to glass substrates. Several repeated heating cycles from –10° C. to 150° C. and/or extended annealing at 150° C. showed no indication of polymer phase separation or degradation. Upon cooling, the specimens retained transparency, indicative of complete miscibility. Above 50 weight percent PVB, the mixtures are miscible, but cannot be cured completely by annealing at 80° C. for 12 hours. The refractive index of the curable transparent PVB/epoxy adhesives is limited to a range of 1.49 to 1.52. The birefringence of the optical adhesives could be reduced appreciably through blending of PVB/epoxy in an appropriate ratio.

EXAMPLE #2

The addition of curing agents, such as capcure, triethylenetetramine (TETA) or methylene dianiline (MDA), to the polymer blends of Example #1, causes phase separation during the curing of epoxy in their mixtures with PVB. This problem may be prevented, if a curing agent is used that can cure both epoxy and PVB. The preferred curing agent is diisocyanatohexane, which cures both polymers through a urethane reaction with the hydroxy group of PVB and crosslinking reaction with epoxide groups. The resultant film is transparent with possible adjustment of the refractive index from approximating zero up to 1.49 to 1.57 to match that of the substrate.

EXAMPLE #3

Polybutadiene grafted with hydroxy terminated epoxide side groups (EPI) were mixed with bisphenol A epoxy (EPON 828) in the ratios of 95/5, 90/10, 80/20 and 70/30 through the aid of a common solvent described previously in Example #1. The solvent cast blends were transparent and thermally curable through the initiation reaction of hydroxide groups of EPI and epoxide groups of Epon. The solvent cast films were subjected to 120–150° C. annealing for 12–24 hours depending on the compositions. While the cured blend films were transparent and possessed good adhesion to glass substrates, the use of curing agents resulted in phase separation, thus the approach is not suitable for optical applications.

EXAMPLE #4

EPI/Epon 828 mixtures can be cured by adding a curing agent without undergoing phase separation. The preferred curing agent is MDA and the procedure requires a two-step curing. In the first stage, various compositions of 95/5 to 5/95 EPI/Epon were mixed with the aid of a common solvent described previously. The mixtures were solvent cast onto a glass substrate and slowly cured at ambient temperature for a minimum of three (3) days. The solvent cast films were then subjected to a second stage curing by annealing at 120° C. for several hours. The resulting films were completely transparent which permits an added flexibility of controlling the refractive indices as well as balancing the birefringence of the material.

EXAMPLE #5

Various mixtures of polymethyl methacrylate (Plexiglass V811) and bisphenol A epoxy (Epon 828) were prepared according to the procedure described in Example #1, except that a curing agent (4,4'-diaminodiphenyl sulfone, DDS), was added in the stoichiometric amount of epoxy with the aid of a common solvent such as acetone with no phase separation. The solvent cast films were transparent at all composition ranging from 5/95 to 95/5. The 50/50 composition showed glass-like transparency. A cover glass was placed and compressed for several times to remove the bubbles. The specimen was subjected to 120° C. heating for about 2 hours to initiate the curing reaction of the epoxy and subsequently cooled down to ambient temperature. The sample was again subjected to 150° C. annealing for 6 hours to fully set the adhesive resin. the cured film remained transparent during repeated heating cycles from –10 to 150° C. Polymethylphenyl methacrylate, polystyrene, styrene-co-acrylonitrile, polyvinyl butyral and various PMMA isomers may be used in lieu of commercial atactic PMMA.

EXAMPLE #6

Functionalized PMMA with hydroxy groups (hereinafter PMMA—OH) was blended with epoxy in chloroform to afford transparent blend adhesives. The thermal curing turned out to be extremely slow, but the addition of a curing agent (diisocyanatohexane) to the mixture expedited the curing reaction, i.e., about a few days. The isocyanate group is known to react with hydroxy groups of PMMA—OH and the epoxide group of epoxies. The cured PMMA/epoxy was transparent at all compositions. The functional group is not limited to the hydroxy group, as demonstrated in this example, and any functional site that can be co-cured (simultaneously) with epoxy with or without a curing agent, may be used for producing a single phase adhesive with a capability of controlling the refractive indices and birefringence values.

EXAMPLE #7

Reactive functional sites can be introduced via copolymerizations (e.g., methyl methacrylate (MMA) co-glycidyl methacrylate (GMA). Monomers of MMA and GMA were copolymerized by radical polymerization by mixing in a common solvent such as acetone/ethyl acetate mixed solvent and using a benzoyl peroxide initiator. The reaction was carried out at an elevated temperature of 80° C. The copolymer was precipitated in a non-solvent and washed several times to remove the initiator and unreacted monomers. The 70/30 MMA/GMA copolymer was co-dissolved together with bisphenol A epoxy in acetone/ethyl acetate. The solvent cast blend films were transparent in all proportions. The mixtures were cured at 100° C. for about 2 days using m-phenylene diamine as a curing agent. The cured films revealed complete transparency and reduced, i.e., essentially eliminated, birefringence in all compositions ranging from 10/90 to 90/10.

LIQUID CRYSTAL COMPENSATOR

Figure 4:
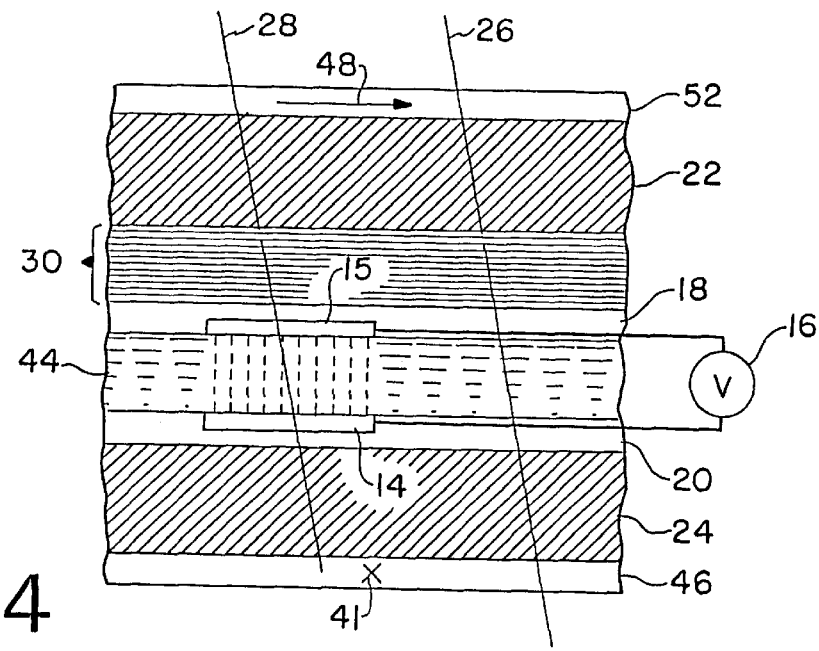
FIG. 4 is a cross-sectional schematic side view of a twisted nematic, transmissive-type liquid crystal display.

FIG. 4 is a cross-sectional schematic side view of a twisted nematic, transmissive type normally white liquid crystal display (LCD) constructed according to the teachings of U.S. Pat. No. 5,196,953, which is hereinby fully incorporated by reference. The display includes a polarizer layer 52, and an analyzer layer 46, between which is positioned a liquid crystal layer 44, consisting of a liquid crystal material in the nematic phase. The polarizer and the analyzer, as is indicated by the symbols 48 (representing a polarization direction in the plane of the drawing) and 41 (representing a polarization direction orthogonal to the plane of the drawing), are oriented with their polarization directions at 90° to one another, as is the case for a normally white display. A first transparent electrode 15 and a second transparent electrode 14 are positioned adjacent to opposite surfaces of the liquid crystal layer so that a voltage can be applied, by means of a voltage source 16, across the liquid crystal layer. In prior art devices, the liquid crystal layer had been sandwiched between a pair of glass plates 18 and 20. Such glass plates are now capable of being polymeric blends. The inner surfaces of the polymeric blends 18 and 20, which are proximate to the liquid crystal layer 44, no longer need to be physically treated, as by buffing, for example. Substrates 22 and 24 provide support structure for the aforementioned layers of the display.

As is well-known in the LCD art, when the material of the liquid crystal layer 44 is in the nematic phase and the inner surfaces of the polymeric blends 18 and 20 (the surfaces adjacent to the layer 44) are oriented perpendicular to the direction of the liquid crystal material, and absent any applied electrical voltage, will tend to align perpendicular to the direction of the liquid crystal material in the regions of the layer proximate each of the polymeric blend 18 to the second major surface adjacent to the polymeric blend 20. Consequently, in the absence of an applied electric field, the direction of polarization of incoming polarized light will be rotated by 90° in travelling through the liquid crystal layer. When the polymeric blend plates and the liquid crystal layer are placed between crossed polarizers, such as the polarizer 48 and the analyzer 41, light polarized by the polarizer 48 and traversing the display, as exemplified by the light ray 26, will thus be aligned with the polarization direction of the analyzer 41 and therefore will pass through the analyzer. When a sufficient voltage is applied to the electrodes 18 and 20, however, the applied electric field causes the director of the liquid crystal material to tend to align parallel to the field. With the liquid crystal material in this state, light passed by the polarizer 48, as illustrated by the light ray 28, will be extinguished by the analyzer 41. Thus an energized pair of electrodes will produce a dark region of the display, while light passing through regions of the display which are not subject to an applied field will produce illuminated regions. As is well-known in the LCD display art, an appropriate pattern of electrodes, activated in selected combinations, can be utilized in this manner to display alphanumeric or graphic information.

Another type of liquid crystal display which can benefit from this invention is the supertwist nematic cell, which exhibits voltage response characteristics allowing it to be addressed by simple multiplexing, thereby avoiding the expense and manufacturing difficulty associated with active matrix addressing. The supertwist configuration is achieved by doping the nematic liquid crystal material with a chiral additive which gives the cell 270° of total twist. Supertwist nematic cells are typically used in the normally black configuration, often employing the compensation techniques described above for normally black displays. Such cells, however, can also be operated in the normally white mode and such normally white supertwist displays would also benefit from the addition of the multilayer compensator of this invention for field of view enhancement. Moreover, the compensation scheme of this invention is broadly applicable to any liquid crystal display which employs a homeotropically aligned state as part of its operation. Other types of liquid crystal displays, such as for example, ferroelectric, can be improved with this invention by acquiring a wider field of view in the aligned state which exhibits C-axis symmetry.

Figure 5:
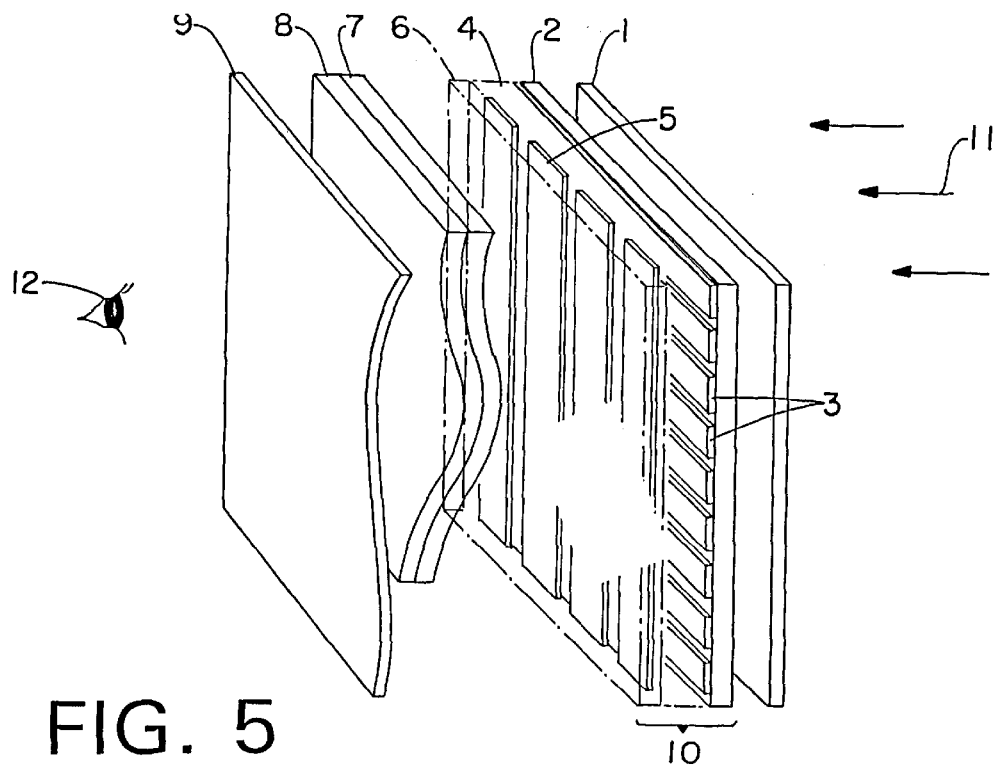
FIG. 5 is a perspective view of an alternative liquid crystal display.

In an alternative embodiment of this invention, FIG. 5 shows a perspective view of a liquid crystal display (LCD) constructed according to the teachings of U.S. Pat. No. 5,138,474, which is hereinby fully incorporated by reference. The display has a structure that includes a liquid crystal cell 10 and films 7,8 having positive and negative intrinsic birefringence values respectively, and are held between two sheets of polarizing sheets 1,9 in an opposed configuration. Additionally liquid crystal cell 10 includes two sheets of transparent substrates 2,6, which can now be fabricated from polymeric alloy blends rather than glass substrate, two transparent electrodes 3,5, and a liquid crystal layer 4 held between the electrodes, and the films interposed between the liquid crystal cell and the polarizing sheet 9 which is provided on the side of an observer.

What has been shown is the preparation and use of an optical adhesive which will permit the adhering of components to a substrate such as glass or a polymer, but yet is also a material which can cycle between low and high temperature without associated delamination, the refractive index of which can be adjusted to fit the needs of the application, and the birefringence of which can be tailored.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. An essentially birefringence-free, essentially transparent optical adhesive comprising:
   a completely miscible polymer blend of
   (a) from about 10 to 90 percent of at least one first polymer containing an epoxide group and having inherent positive birefringence due to the presence of a plurality of arylene groups along the longitudinal axis of the polymer, the first polymer having at least two reactive functional groups; and
   (b) from about 90 to 10 percent of at least one second polymer having essentially compensating amounts of inherent negative birefringence due to the presence of at least one side chain attached transversely to the backbone of the second polymer, the second polymer having at least one functional group which second polymer is co-cured simultaneously with the first polymer such that the optical adhesive is essentially birefringence-free and essentially transparent.

2. The adhesive of claim 1 wherein the first polymer is selected from the group consisting of bisphenol-A based polymers and the second polymer is selected from the group consisting of copolymers having glycidyl methacrylate as a co-monomer.

3. The adhesive of claim 1 which further comprises a curing agent or treatment.

4. The adhesive of claim 1 wherein delamination does not occur through at least two heating cycles from −10° C. to 150° C., the refractive index of which can be adjusted to fit the needs of the application through the ratio of the first and second polymers.

\* \* \* \* \*